United States Patent Office 3,193,588
Patented July 6, 1965

3,193,588
CYCLODODECYL-CHLORO-OLEFINS
Louis Schmerling, Riverside, Ill., assignor to Universal Oil Products Company, Des Plaines, Ill., a corporation of Delaware
No Drawing. Filed Dec. 18, 1961, Ser. No. 160,340
11 Claims. (Cl. 260—648)

This invention relates to new and useful compositions of matter formed by the condensation of cyclododecane with certain polychloroolefins. The novel organic compounds thus formed are useful as insecticides as well as chemical intermediates in the preparation of detergents, plasticizers, carboxylic acids and other useful organic compounds.

It is an object of this invention to disclose novel compositions of matter produced by the condensation of cyclododecane with a polychloroolefin.

One embodiment of the present invention relates to a halocyclododecylolefin condensation product of cyclododecane and a polychloroolefin.

Another embodiment of this invention relates to a chlorocyclododecylethylene condensation product of cyclododecane and a polychloroethylene.

One specific embodiment of this invention relates to the 1-chloro-2-cyclododecylethylene condensation product of cyclododecane and 1,2-dichloroethylene.

Another specific embodiment of the present invention relates to the 1,1-dichloro-2-cyclododecylethylene condensation product of cyclododecane and 1,1,2-trichloroethylene.

Still another specific embodiment of this invention relates to the 1,1,2-trichloro-2-cyclododecylethylene condensation product of cyclododecane and tetrachloroethylene.

A further specific embodiment relates to the 1,3,4,7,7-pentachloro-2-cyclododecylbicyclo [2.2.1]-2- heptene condensation product of cyclododecane and 1,2,3,4,7,7-hexachlorobicyclo [2.2.1]-2-heptene.

Another specific embodiment of this invention relates to the 2,3,4,5,5-pentachloro-1-cyclododecylcyclopentadiene condensation product of cyclododecane and hexachlorocyclopentadiene.

Further objects as well as embodiments relating to halocyclododecylolefins, halocyclododecylbicycloolefins, halocyclododecylbicyclcoolefins, halocyclododecyldiolefins, and halocyclododecylcyclodiolefins, will be found in the following detailed description of this invention.

In accordance with the present invention, novel compositions of matter are formed as condensation products of cyclododecane and polychloroolefins. The polychloroolefins which may be utilized to form the desired novel compositions of matter comprise olefins wherein each of two doubly bonded carbon atoms has attached thereto at least one chlorine atom. It is essential that said atoms be chlorine atoms as opposed to halogen atoms in general as olefins containing other halogen atoms instead of chlorine in the aforesaid positions do not react in the manner herein contemplated. However, the polychloroolefins may contain other halogen substituents, such as fluorine, as the reactivity of the chlorine atoms is not noticeably affected thereby. In such case the condensation product will comprise halogen other than, and in addition to, chlorine. The olefin may be either of the open chain or cyclic type, including bicyclic, and may be either a monoolefin or a diolefin. It is essential to the formation of the desired novel compositions of matter that the olefin contain at least two chlorine atoms per molecule, since monochloroolefins do not react with cyclododecane in the manner herein contemplated.

Thus, suitable polychloroolefins include 1,2-dichloroethylene, trichloroethylene, tetrachloroethylene, 1,2-dichloro-1-propene, 1,1,2-trichloro-1-propene, 3,3,3-trifluoro-1,2-dichloro-1-propene, 1,2-dichloro-1-butene, 1,1,2-trichloro-1-butene, 2,3-dichloro-2-butene, etc., as well as polychlorocycloolefins including 1,2-dichlorocyclopentene, 1,2,3-trichlorocyclopentene, 1,2,4-trichlorocyclopentene, 1,2,3,4-tetrachlorocyclopentene, 1,2,3,4,4,5-hexachlorocyclopentene, 1,2-dichlorocyclohexene, 1,2,3-trichlorocyclohexene, 1,2,4-trichlorocyclohexene, 1,2,3,4-tetrachlorocyclohexene, 1,2,3,4,5-penta chlorocyclohexene, 1,2,3,4,5, 6-hexachlorocyclohexene, etc. and also polychlorobicycloolefins including 2,3-dichlorobicyclo [2.2.1]-2-heptene, 1,2,3-trichlorobicyclo [2.2.1]-2-heptene, 2,3,7-trichlorobicyclo [2.2.1]-2-heptene, 1,2,3,6-tetrachlorobicyclo [2.2.1]-2-heptene, 1,2,3,5-tetrachlorobicyclo [2.2.1]-2-heptene, 1, 2,3,4-tetrachlorobicyclo [2.2.1]-2-heptene, 2,3,7,7-tetrachlorobicyclo [2.2.1]-2-heptene, 1,2,3,5,6-pentachlorobicyclo [2.2.1] - 2 - heptene, 1,2,3,4,6 - pentachlorobicyclo [2.2.1]-2-heptene, 1,2,3,4,5,6-hexachlorobicyclo [2.2.1]-2-heptene, 1,2,3,4,5,6,7-heptachlorobicyclo [2.2.1]-2-heptene, 1,2,3,4,5,6,7,7-octachlorobicyclo [2.2.1]-2-heptene, etc. Suitable polychloroolefins also include dienes, for example, hexachloro-1,3-butadiene, 1,2,3,4-tetrachloro-1, 3-butadiene, etc., and also polychlorocyclodienes, particularly conjugated dienes, including 1,2,3,4-tetrachlorocyclopentadiene, 1,2,3,4,5-pentachlorocyclopentadiene, 1, 2,3,4,5,5-hexachlorocyclopentadiene, etc., and also 2,3,5, 6-tetrachlorobicyclo [2.2.1]-2,5-heptadiene, and the like.

Condensation of cyclododecane and a polychloroolefin to form the novel compositions of matter herein contemplated can be effected in the presence of a catalyst capable of forming free radicals at condensation reaction conditions. These include peroxy compounds containing the bi-valent radical —O—O— which decompose to form free radicals and initiate the general reaction, i.e., the condensation of cyclododecane with a polychloroolefin. Examples of such catalysts include the persulfates, perborates, and percarbonates of ammonium and of the alkali metals. Organic peroxy compounds constitute a preferred class of peroxy compounds and include peracetic acid, persuccinic acid, dimethyl peroxide, diethyl peroxide, diisopropyl peroxide, di-t-butyl peroxide, acetyl peroxide, butyryl peroxide, lauroyl peroxide, benzoyl peroxide, 2,4-dichlorobenzoyl peroxide, tetralin peroxide, urea peroxide, t-butyl perbenzoate, t-butyl hydroperoxide, methylcyclohexyl hydroperoxide, diisopropylbenzoyl hydroperoxide, cumene hydroperoxide, methylethylketone peroxide, cyclohexanone peroxide, etc., the dialkyl and diacyl peroxides being particularly preferred. Mixtures of peroxy compounds may be employed as catalysts, or said peroxy compounds may be utilized in admixture with various diluents. Thus, commercially available organic peroxy compounds compounded with various diluents including, benzoyl peroxide compounded with calcium sulfate, benzoyl peroxide compounded with camphor, etc., may be utilized.

Typical novel compositions of matter or new compounds of the present invention which may be prepared in the manner herein described include 1-chloro-2-cyclododecylethylene,
1,1-dichloro-2-cyclododecylethylene,
1,1,2-trichloro-2-cyclododecylethylene,
2-chloro-1-cyclododecyl-1-propene,
1,2-dichloro-1-cyclododecyl-1-propene,
1,1-dichloro-2-cyclododecyl-1-propene,
2-chloro-1-cyclododecyl-1-butene,
1,2-dichloro-1-cyclododecyl-1-butene,
3-chloro-2-cyclododecyl-2-butene,
2-chloro-1-cyclododecyl-1-pentene,
1,2-dichloro-1-cyclododecyl-1-pentene,
1,1-dichloro-2-cyclododecyl-1-pentene,
2-chloro-3-cyclododecyl-2-pentene, 3-chloro-2-cyclododecyl-2-pentene,
2-chloro-1-cyclododecyl-1-hexene,
2-chloro-4-methyl-1-cyclododecyl-1-pentene,
1,2-dichloro-1-cyclododecyl-1-hexene,
1,1-dichloro-2-cyclododecyl-1-hexene,
3-chloro-2-cyclododecyl-2-hexene,
2-chloro-3-cyclododecyl-2-hexene,
3-chloro-4-cyclododecyl-3-hexene,
2-chloro-1-cyclododecyl-1-heptene,
1,2-dichloro-1-cyclododecyl-1-heptene,
1,1-dichloro-2-cyclododecyl-1-heptene,
2-chloro-3,3,3-trifluoro-1-cyclododecyl-1-propene,
1,2-difluoro-2-chloro-1-cyclododecylethylene,
1-chloro-2-cyclododecylcyclopentene,
1,4-dichloro-2-cyclododecylcyclopentene,
1,5-dichloro-2-cyclododecylcyclopentene,
1,4,5-trichloro-2-cyclododecylcyclopentene,
1,3,4-trichloro-2-cyclododecylcyclopentene,
1,3,4,5-tetrachloro-2-cyclododecylcyclopentene,
1,3,4,4,5-pentachloro-2-cyclododecylcyclopentene,
1-chloro-2-cyclododecylcyclohexene,
1,6-dichloro-2-cyclododecylcyclohexene,
1,5-dichloro-2-cyclododecylcyclohexene,
1,5,6-trichloro-2-cyclododecylcyclohexene,
1,4,5,6-tetrachloro-2-cyclododecylcyclohexene,
1,3,4,5,6-pentachloro-2-cyclododecylcyclohexene,
2,chloro-3-cyclododecylbicyclo [2.2.1]-2-heptene,
1,2-dichloro-3-cyclododecylbicyclo [2.2.1]-2-heptene,
1,3-dichloro-2-cyclododecylbicyclo [2.2.1]-2-heptene,
2,6-dichloro-3-cyclododecylbicyclo [2.2.1]-2-heptene,
3,6-dichloro-2-cyclododecylbicyclo [2.2.1]-2-heptene,
2,7-dichloro-3-cyclododecylbicyclo [2.2.1]-2-heptene,
1,2,6-trichloro-3-cyclododecylbicyclo [2.2.1]-2-heptene,
1,3,6-trichloro-2-cyclododecylbicyclo [2.2.1]-2-heptene,
1,3,5-trichloro-2-cyclododecylbicyclo [2.2.1]-2-heptene,
1,2,5-trichloro-3-cyclododecylbicyclo [2.2.1]-2-heptene,
1,3,4-trichloro-2-cyclododecylbicyclo [2.2.1]-2-heptene,
1,2,4-trichloro-3-cyclododecylbicyclo [2.2.1]-2-heptene,
2,7,7-trichloro-3-cyclododecylbicyclo [2.2.1]-2-heptene,
1,3,5,6-tetrachloro-2-cyclododecylbicyclo [2.2.1]-2-heptene,
1,2,5,6-tetrachloro-3-cyclododecylbicyclo [2.2.1]-2-heptene,
1,3,4,6-tetrachloro-2-cyclododecylbicyclo [2.2.1]-2-heptene,
1,2,4,6-tetrachloro-3-cyclododecylbicyclo [2.2.1]-2-heptene,
1,3,4,5,6-pentachloro-2-cyclododecylbicyclo [2.2.1]-2-heptene,
1,2,4,5,6-pentachloro-3-cyclododecylbicyclo [2.2.1]-2-heptene,
1,3,4,7,7-pentachloro-2-cyclododecylbicyclo [2.2.1]-2-heptene,
1,3,4,5,6,7-hexachloro-2-cyclododecylbicyclo [2.2.1]-2-heptene,
1,2,4,5,7,7-hexachloro-3-cyclododecylbicyclo [2.2.1]-2-heptene,
1,2,4,6,7,7-hexachloro-3-cyclododecylbicyclo [2.2.1]-2-heptene,
1,3,4,5,6,7,7-heptachloro-2-cyclododecylbicyclo [2.2.1]-2-heptene,
1-chloro-2-phenyl-2-cyclododecylethylene,
1-chloro-1-phenyl-2-cyclododecylethylene,
1-chloro-1-phenyl-2-cyclododecyl-1-propene,
2-chloro-1-phenyl-1-cyclododecyl-1-propene,
1,1,2,3,4-pentachloro-4-cyclododecylbutadiene,
2,3,4-trichloro-1-cyclododecylbutadiene,
2,3-dichloro-1,4-dicyclododecylbutadiene,
2,3,4-trichloro-1-cyclododecyl-1,3-cyclopentadiene,
1,3,4-trichloro-2-cyclododecyl-1,3-cyclopentadiene,
2,3,4,5-tetrachloro-1-cyclododecyl-1,3-cyclopentadiene,
2,3,5,5-tetrachloro-1,4-dicyclododecyl-1,3-cyclopentadiene,
2,3,4,5-tetrachloro-1,5-dicyclododecyl-1,3-cyclopentadiene,
2,3,4,5,5-pentachloro-1-cyclododecyl-1,3-cyclopentadiene,
1,2,3,4,5-pentachloro-5-cyclododecyl-1,3-cyclopentadiene,
2,3,4-trichloro-1-cyclododecyl-1,4-cyclohexadiene,
1,3,4-trichloro-2-cyclododecyl-1,4-cyclohexadiene,
1,3,4,5-tetrachloro-2-cyclododecyl-1,4-cyclohexadiene,
2,3,4,5-tetrachloro-1-cyclododecyl-1,4-cyclohexadiene,
2,3,4,5,6-pentachloro-1-cyclododecyl-1,4-cyclohexadiene,
2,3,4,6-tetrachloro-1,5-dicyclododecyl-1,4-cyclohexadiene,
2,3,5,6-tetrachloro-1,4-dicyclododecyl-1,4-cyclohexadiene,
1,3,4,5,6,7,7-heptachloro-2-cyclododecylbicyclo [2.2.1]-2,5-heptadiene.

It is to be understood that the above described compounds are only representative of the type herein disclosed and it is not intended to limit this invention solely to the enumerated compounds.

Hydrogen chloride is evolved in the condensation reactions herein contemplated. In cases where it is desirable to avoid radical changes in pH during the course of the reaction, small amounts of materials which have a buffering effect may be included in the condensation reaction mixture. Since the condensations can be carried out satisfactorily in either an acid or an alkaline medium, many types of buffering agents can be used. For example, an alkaline pH can be maintained by the use of such buffers as borax, disodium phosphate, sodium carbonate, ammonium carbonate, sodium acetate, etc. For a pH below 7, such materials as acetic acid, propionic acid, and other organic acids, as well as monosodium phosphate, sodium hydroxide plus potassium acid phthalate, and the like may be used. In yet another mode of operation the reactants and the peroxide are heated with water, with or without the addition of an emulsifying agent. The presence of water does not appear to have a harmful effect on the reaction as might be anticipated, in fact, the yield of the desired product is in many cases actually increased thereby.

The condensation reaction involving the aforementioned starting materials is effected at an elevated reaction temperature which should be at least as high as the initial decomposition temperature of the particular free radical generating catalyst utilized in order to liberate and form free radicals which promote the reaction. In selecting a particular reaction temperature, two considerations must be taken into account. First, sufficient energy in the form of heat must be supplied to the reaction system so that the reactants, namely the cyclododecane and the selected polychloroolefin, will be activated sufficiently for condensation to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the desired chain reaction to take place, and these radicals must be formed at a temperature at which the reactants are in a suitably activated state for condensation. When the half life of the free radical generating catalyst is greater than 10 hours, radicals are not generated at a sufficient rate to cause the contemplated reaction to go forward at a detactable rate. Thus the reaction temperature may be within the range of from about 50° to about 300° C. and at least as high as the decomposition temperature of the catalyst, by which is meant a temperature such as the half life of the free radical generating catalyst is not greater than 10 hours. Since the half life for each free radical generating catalyst is different as different temperatures, the exact temperature to be utilized in a particular reaction will vary. However, persons skilled in the art are well acquainted with the half life vs. temperature data for different free radical generating catalysts. Thus it is within the skill of one familiar with the art to select the particular temperature needed for any particular catalyst. However, the operating temperatures generally should not exceed the decomposition temperature of the catalyst by substantially more than about 150° C. since free radical generating catalysts decompose rapidly under such conditions. For example, the half life of t-butyl perbenzoate is less than 10 hours at about 110° C., and therefor when this peroxy compound is used, the reaction temperature is from about 110° C. to about 300° C., but generally not greater than about 265° C. A reaction temperature of from about 130° C. to about 300° C. is suitable when the peroxy compound is di-t-butylperoxide, and is from about 75° C. to about 300° C., but generally not in excess of about 225° C., with benzoyl peroxide. Higher reaction temperatures may be employed, but little advantage is gained if the temperature is in excess of the decomposition temperature of the catalyst by more than about 150° C. as hereinbefore mentioned. The general effect of increasing the operating temperature is to accelerate the rate of the condensation reaction between the cyclododecane and the selected polychloroolefin. However, the increased rate of reaction may be accompanied by an increased amount of undesirable decomposition.

The condensation reaction conditions herein utilized relate principally to temperature. Although it may be desirable to employ superatmospheric pressures of up to about 100 atmospheres or more, for example to maintain the reactants in a liquid phase during the course of the reaction, pressure is not considered to be an important variable in relation to the herein described condensation reaction and in many cases may be simply autogenous pressure developed during the course of the reaction. In batch type operations it is often desirable to utilize pressure withstanding equipment to charge the reactants and catalyst to the vessel, and to pressure the vessel with 10, or 30 or 50 or more atmospheres with an inert gas such as nitrogen to insure the presence of liquid phase conditions. The concentration of the catalyst may vary over a rather wide range but it is desirable to utilize low concentrations of catalysts such as from about 0.1% to about 10% of the total weight of the combined starting materials charged to the process. The reaction time may be within the range of from less than one minute to several hours, depending upon temperature and half life of the catalyst. Generally speaking, contact times of at least 10 minutes are preferred.

The condensation reaction, resulting in the novel compositions of matter herein described, may be effected in any suitable manner and may comprise either a batch or a continuous type of operation. For example, when a batch type operation is used, a quantity of a starting material comprising cyclododecane along with the selected polychloroolefin are placed in an appropriate apparatus provided with heating and mixing means, along with a catalytic amount of the organic peroxy compound. If the reaction is to be effected at atmospheric pressures a condensation flask is sufficient. However, in the event that superatmospheric pressures are to be employed, the aforesaid starting materials may be placed in a glass liner of a rotating autoclave along with the catalyst and sealed therein. The desired pressure is effected by the introduction of an inert gas such as nitrogen and the apparatus is thereafter heated to the desired operating temperature. Upon completion of the desired residence time the flask or autoclave, along with the contents thereof, is cooled to room temperature. Any excess pressure is vented and the reaction product is separated from any remaining catalyst and/or side reaction products and recovered by conventional means such as fractional distillation, crystallization, etc.

Another method of effecting the condensation reaction of the present type is by a continuous type operation. In this type of operation the starting materials comprising the cyclododecane and the selected polychloroolefin are continuously charged to a reaction zone which is maintained at the proper operating conditions of temperature and pressure. These starting materials may be charged to the reaction zone through separate lines, or if so desired may be combined before entry into said reactor and charged thereto in a single line. The reaction zone may comprise an unpacked coil or vessel, which may be lined with an absorbent packing material such as fire brick, alumina, dehydrated bauxite and the like. The peroxy compound which acts as a catalyst may also be continuously charged to the reaction zone through separate lines in a catalytic amount per amount of starting material. After a desired residence time has elapsed the reaction product is continuously withdrawn, separated from a reactor effluent and purified by conventional means hereinbefore set forth.

The nature of this invention is illustrated further by the following examples, which however should not be construed to unduly limit the generally broad scope of the invention.

*Example I*

Forty-nine grams of cyclododecane, 43 g. of trichloroethylene, 14 g. of di-t-butyl peroxide, and 100 g. of water were placed in a glass liner which in turn was inserted in an 850 cc. capacity rotating autoclave. The autoclave contents were sealed therein under an initial pressure of 30 atm. of nitrogen. The autoclave contents were thereafter heated at a temperature of from about 130° C to about 140° C. for a 5 hour period during which time said contents were continuously mixed by the rotating motion of the autoclave. The autoclave was then cooled to about room temperature and vented to the atmosphere. The organic layer was separated from the reaction mixture as a pentane extract, water-washed and dried, and subjected to fractional distillation at reduced pressure. A 16% yield of the desired 1,1-dichloro-2-cyclododecylethylene was recovered as an intermediate cut boiling at 108–111° C. at 0.4 mm., and having a refractive index of 1.5052 at 21.5° C. This cut was analyzed for chlorine with the following results. Calculated, 26.94. Found, 27.0.

*Example II*

Fifty-two grams of cyclododecane, 37 g. of 1,2-dichloroethylene, 10 g. of di-t-butyl peroxide, and 39 g. of potassium carbonate were placed in a glass liner which was in turn inserted in an 850 cc. rotating autoclave. The autoclave contents were thereafter subjected to the reaction conditions of Example I above for a period of 5.5 hours. The mixture of solid and liquid organic product was extracted with pentane and water-washed and dried. The dried pentane extract was subjected to fractional distillation at reduced pressure. A 20% yield of the desired 1-chloro-2-cyclododecylethylene was recovered as an intermediate cut boiling at 119° C. at 2.1 mm., and having a refractive index of 1.4997 at 22° C. This cut was analyzed for chlorine with the following results. Found, 15.1. Calculated, 15.5.

*Example III*

Forty-nine grams of cyclododecane, 55 g. of tetrachloroethylene, 14 g. di-t-butyl peroxide, and about 100 g. of water are placed in a glass liner of a rotating autoclave which is thereafter sealed and pressured to about 30 atm. with nitrogen. The autoclave and contents thereof are then heated at a temperature of from about 130–140° C. for a 4–5 hour period. At the end of this time the autoclave is cooled to room temperature and vented to the atmosphere. The product is extracted from the vessel contents with pentane and the pentane extract is water-washed and dried. The dried extract is fractionally distilled at a reduced pressure and the 1,1,2-trichloro-2-cyclododecylethylene cut recovered.

*Example IV*

Fifty-two grams of cyclododecane, 95 grams of 1,2,3,4,7,7-hexachlorobicyclo[2.2.1]-2-heptene, 14 grams of di-t-butyl peroxide, and about 40 grams of potassium carbonate are placed in a glass liner of a rotating autoclave which is thereafter sealed and pressured to about 30 atmospheres of nitrogen. The autoclave and contents thereof are then heated at a temperature of about 130–140° C. for a 4–5 hour period. At the end of this time the autoclave is cooled to room temperature and vented to the atmosphere. The product is extracted from the vessel contents with pentane and the pentane extract is water-washed and dried. The dried extract is fractionally distilled at reduced pressure and the desired 1,3,4,7,7-pentachloro-2-cyclododecylbicyclo[2.2.1]-2-heptene cut is recovered.

*Example V*

Fifty-two grams of cyclododecane, 78 grams of 1,2,3,4,5,5-hexachlorocyclopentene, 14 grams of di-t-butyl-peroxide, and about 40 grams of potassium carbonate are placed in a glass liner in a glass lined autoclave and sealed therein under 30 atmospheres of nitrogen. The autoclave and contents thereof are then heated at a temperature of from about 130° C. to about 140° C. for a 4–5 hour period. At the end of this time the autoclave is cooled to room temperature and vented to the atmosphere. The product is extracted from the vessel contents with pentane and the pentane extract is water-washed and dried. The dried extract is subjected to fractional distillation at reduced pressure and the desired 2,3,4,5,5-pentachloro-1-cyclododecylcyclopentadiene cut is recovered.

I claim as my invention:

1. A chlorocyclododecylcycloolefin in which a carbon atom is singly bonded to an otherwise unsubstituted cyclododecyl radical and doubly bonded to a carbon atom having at least one chlorine atom attached thereto.
2. The compound of claim 1 further characterized in that the cycloolefin moiety thereof is cyclopentene.
3. The compound of claim 1 further characterized in that the cycloolefin moiety thereof is a bicycloolefin.
4. The compound of claim 1 further characterized in that the cycloolefin moiety thereof is bicycloheptene.
5. A cholorocyclododecyldiolefin in which a carbon atom is singly bonded to an otherwise unsubstituted cyclododecyl radical and doubly bonded to a carbon atom having at least one chlorine atom attached thereto.
6. The compound of claim 5 further characterized in that the diolefin moiety thereof is butadiene.
7. A chlorocyclododecylcyclodiolefin in which a carbon atom is singly bonded to an otherwise unsubstituted cyclododecyl radical and doubly bonded to a carbon atom having at least one chlorine atom attached thereto.
8. The compound of claim 7 further characterized in that the cyclodiolefin moiety thereof is cyclopentadiene.
9. 1,1,2-trichloro-2-cyclododecylethylene.
10. 1,3,4,7,7 - pentachloro - 2 - cyclododecylbicyclo-[2.2.1]-2-heptene.
11. 2,3,4,5,5-pentachloro - 1 - cyclododecyl-1,3-cyclopentadiene.

References Cited by the Examiner
UNITED STATES PATENTS

| | | | |
|---|---|---|---|
| 2,562,369 | 7/51 | Schmerling | 260—648 |
| 2,799,614 | 7/57 | Mark | 167—30 |
| 2,804,420 | 8/57 | Danish et al. | 167—30 |
| 3,012,933 | 12/61 | Phillips | 260—648 |
| 3,110,648 | 11/63 | Feichinger et al. | 167—30 |

OTHER REFERENCES

Degering: "An Outline of Org. Chem.," 5th edition, p. 171 (1947).

Ziegler et al.: "Annalen der Chemie," vol. 589, No. 2 (1954), pp. 157–62.

LEON ZITVER, *Primary Examiner.*

ALPHONSO D. SULLIVAN, *Examiner.*